(12) United States Patent
Jiang

(10) Patent No.: US 10,990,672 B2
(45) Date of Patent: Apr. 27, 2021

(54) METHOD AND APPARATUS FOR OBTAINING VIRUS LIBRARY, DEVICE, SERVER, AND SYSTEM

(71) Applicant: Tencent Technology (Shenzhen) Company Limited, Shenzhen (CN)

(72) Inventor: Peng Jiang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 155 days.

(21) Appl. No.: 16/041,543

(22) Filed: Jul. 20, 2018

(65) Prior Publication Data

US 2018/0349601 A1    Dec. 6, 2018

Related U.S. Application Data

(63) Continuation-in-part of application No. PCT/CN2017/074179, filed on Feb. 20, 2017.

(30) Foreign Application Priority Data

May 19, 2016 (CN) .......................... 201610338814.5

(51) Int. Cl.
*G06F 21/56* (2013.01)
*G06K 9/62* (2006.01)
(Continued)

(52) U.S. Cl.
CPC ............ *G06F 21/561* (2013.01); *G06F 8/427* (2013.01); *G06F 21/563* (2013.01);
(Continued)

(58) Field of Classification Search
CPC ...... G06F 21/561; G06F 21/564; G06F 21/64; G06F 8/427; G06F 21/563; G06F 8/41;
(Continued)

(56) References Cited

U.S. PATENT DOCUMENTS 6,880,107 B1* 4/2005 Kraft, IV ................ G06F 11/08
                                                                      713/2
8,321,941 B2* 11/2012 Tuvell .................. H04W 12/128
                                                                      726/24
(Continued)

FOREIGN PATENT DOCUMENTS

CN     1349166 A     5/2002
CN     1818823 A     8/2006
(Continued)

OTHER PUBLICATIONS

Tencent Technology, ISRWO, PCT/CN2017/074179, May 26, 2017, 7 pgs.
(Continued)

*Primary Examiner* — Saleh Najjar
*Assistant Examiner* — Feliciano S Mejia
(74) *Attorney, Agent, or Firm* — . Morgan, Lewis & Bockius LLP

(57) ABSTRACT

Embodiments of the present disclosure disclose a method for obtaining a virus library performed at a computing system. The computing system obtains a sample set, each sample being a malicious installation package. The computing system extracts a group of sample features from each sample as a sample feature set. The computing system performs feature selection on the sample feature set, to obtain at least one group of target features, each target feature meeting a first preset condition. The computing system then updates the at least one group of target features to a virus library. An antivirus platform determines whether the feature of a to-be-detected installation package comprises any group of target features in the virus library and determines that the to-be-detected installation package is a malicious installation package when the feature of the to-be-detected instal-
(Continued)

lation package comprises any group of target features in the virus library.

20 Claims, 6 Drawing Sheets

(51) Int. Cl.
| | |
|---|---|
| *G06N 20/00* | (2019.01) |
| *G06N 5/00* | (2006.01) |
| *G06F 8/41* | (2018.01) |
| *G06F 21/64* | (2013.01) |
| *G06N 5/04* | (2006.01) |
| *G06F 8/61* | (2018.01) |

(52) U.S. Cl.
CPC ............ *G06F 21/564* (2013.01); *G06F 21/64* (2013.01); *G06K 9/6217* (2013.01); *G06K 9/6228* (2013.01); *G06K 9/6282* (2013.01); *G06N 5/003* (2013.01); *G06N 5/04* (2013.01); *G06N 20/00* (2019.01); *G06F 8/41* (2013.01); *G06F 8/61* (2013.01)

(58) Field of Classification Search
CPC ......... G06F 8/61; G06F 21/56; G06K 9/6228; G06K 20/00; G06K 9/6282; G06K 9/6217; G06N 5/003; G06N 5/04; H04L 63/1416; H04L 63/145
See application file for complete search history.

(56) References Cited

U.S. PATENT DOCUMENTS

| | | | | |
|---|---|---|---|---|
| 8,448,245 | B2* | 5/2013 | Banerjee | H04L 63/1433 |
| | | | | 726/22 |
| 8,528,087 | B2* | 9/2013 | Hsu | G06F 21/566 |
| | | | | 726/23 |
| 8,874,579 | B2* | 10/2014 | Sinclair | H04L 51/12 |
| | | | | 707/737 |
| 8,955,133 | B2* | 2/2015 | Kumar | G06F 21/552 |
| | | | | 726/24 |
| 9,064,113 | B2* | 6/2015 | Li | G06F 21/562 |
| 9,197,665 | B1* | 11/2015 | Cabot | G06F 21/564 |
| 9,690,933 | B1* | 6/2017 | Singh | G06F 21/56 |
| 9,747,452 | B2* | 8/2017 | Wang | G06F 21/577 |
| 9,800,609 | B2* | 10/2017 | Liao | G06F 21/567 |
| 9,836,603 | B2* | 12/2017 | RoyChowdhury | G06F 21/564 |
| 10,084,822 | B2* | 9/2018 | Papamartzivanos | G06N 3/126 |
| 10,200,389 | B2* | 2/2019 | Rostamabadi | H04L 63/1425 |
| 10,296,743 | B2* | 5/2019 | Yuan | G06F 21/564 |
| 2012/0278896 | A1 | 11/2012 | Fang et al. | |
| 2012/0304244 | A1* | 11/2012 | Xie | G06F 21/00 |
| | | | | 726/1 |
| 2013/0091571 | A1* | 4/2013 | Lu | G06F 21/563 |
| | | | | 726/23 |
| 2014/0201208 | A1* | 7/2014 | Satish | G06F 21/564 |
| | | | | 707/737 |
| 2015/0244730 | A1* | 8/2015 | Vu | G06F 21/561 |
| | | | | 726/24 |
| 2015/0244733 | A1* | 8/2015 | Mohaisen | G06F 21/566 |
| | | | | 726/23 |
| 2015/0256552 | A1* | 9/2015 | Lee | G06F 21/554 |
| | | | | 726/24 |
| 2015/0295808 | A1* | 10/2015 | O'Malley | H04L 47/22 |
| | | | | 709/224 |
| 2015/0295945 | A1* | 10/2015 | Canzanese, Jr. | G06F 9/45545 |
| | | | | 726/23 |
| 2015/0347753 | A1 | 12/2015 | Tuvell et al. | |
| 2016/0065594 | A1* | 3/2016 | Srivastava | H04L 63/1408 |
| | | | | 726/23 |
| 2016/0328742 | A1* | 11/2016 | Shiravi Khozani | G06F 21/53 |

FOREIGN PATENT DOCUMENTS

| | | |
|---|---|---|
| CN | 102831338 A | 12/2012 |
| CN | 102904874 A | 1/2013 |
| CN | 103473506 A | 12/2013 |
| CN | 104915596 A | 9/2015 |
| CN | 105095755 A | 11/2015 |
| CN | 105224600 A | 1/2016 |
| WO | WO 2015101097 A1 | 7/2015 |

OTHER PUBLICATIONS

Tencent Technology, IPRP, PCT/CN2017/074179, Nov. 20, 2018, 5 pgs.

* cited by examiner

METHOD AND APPARATUS FOR OBTAINING VIRUS LIBRARY, DEVICE, SERVER, AND SYSTEM

PRIORITY CLAIM AND RELATED APPLICATION

This application is a continuation-in-part application of PCT/CN2017/074179, entitled "VIRUS DATABASE ACQUISITION METHOD AND DEVICE, EQUIPMENT, SERVER AND SYSTEM" filed on Feb. 20, 2017, which claims priority to Chinese Patent Application No. 201610338814.5, filed with the State Intellectual Property Office of the People's Republic of China on May 19, 2016, and entitled "METHOD AND APPARATUS FOR OBTAINING VIRUS LIBRARY, DEVICE, SERVER, AND SYSTEM", all of which are incorporated herein by reference in their entirety.

FIELD OF THE TECHNOLOGY

The present disclosure relates to the field of Internet security, and in particular, to a method and an apparatus for obtaining a virus library, a device, a server, a system, and a storage medium.

BACKGROUND OF THE DISCLOSURE

With the popularization and development of mobile terminals, various installation packages applicable to the terminals emerge. Some malicious installation packages with a virus may enter a terminal of a user without the user's awareness, bringing hidden trouble to information security and property security of the user.

Generally, feature codes forming a virus library are obtained according to a large quantity of manual analysis, the quantity of feature codes obtained every day is limited, the time costs are high, and the efficiency is low. The feature codes are extracted according to experience of analysts, and the false alarm possibility is high. Moreover, as a new malicious installation package copes with the existing feature code technology, a detection rate for a part of installation packages by using the feature code technology is gradually reduced.

SUMMARY

In view of this, embodiments of the present disclosure provide a method and an apparatus for obtaining a virus library, a device, a server, a system, and a storage medium, to resolve at least one problem in the existing technology, so that the obtaining costs is low and the efficiency is high, and a new malicious installation package can be identified more accurately.

The technical solutions of the present disclosure are implemented as follows:

A first aspect of the present disclosure provides a method for obtaining a virus library performed at a computing system having one or more processors and memory storing a plurality of programs to be executed by the one or more processors, the method comprising:

obtaining a sample set, each sample in the sample set being a malicious installation package;

extracting a group of sample features from each sample, to obtain a sample feature set, the sample feature set comprising groups of extracted sample features;

performing feature selection on the sample feature set, to obtain at least one group of target features, each target feature being a feature that is in the sample feature set and that meets a first preset condition; and updating the at least one group of target features to a virus library.

A second aspect of the present disclosure provides a computing system having one or more processors, memory coupled to the one or more processors, and a plurality of programs stored in the memory that, when executed by the one or more processors, cause the computing system to perform the method for obtaining a virus library as described above.

An embodiment of the present disclosure provides a non-transitory computer readable storage medium, the non-transitory computer readable storage medium storing computer executable instructions, and the computer executable instructions being used by a computing system to perform the method for obtaining a virus library as described above.

The embodiments of the present disclosure provide a method and an apparatus for obtaining a virus library, a device, a server, a system, and a storage medium. The method includes: obtaining a sample set, each sample in the sample set being a malicious installation package; extracting a group of sample features from each sample, to obtain a sample feature set, the sample feature set including groups of extracted sample features; performing feature selection on the sample feature set, to obtain at least one group of target features, each target feature being a feature that is in the sample feature set and that meets a first preset condition; and updating the at least one group of target features to a virus library. The entire process of the embodiments of the present disclosure is automatically completed by a computing device, and feature extraction and feature selection on a huge quantity of malicious installation packages can be completed every day, to obtain a large quantity of target features. Compared with manual analysis in the existing technology, less time is cost, the efficiency is high, there is no manual intervention problem in the entire process, and the computing device can automatically select a target feature that meets a first condition. An antivirus platform detects an installation package by using the selected target feature, researchers of the malicious installation packages cannot bypass detection by simply adjusting code in the installation package, and a new malicious installation package can be identified more accurately.

DESCRIPTION OF EMBODIMENTS

Figure 1:
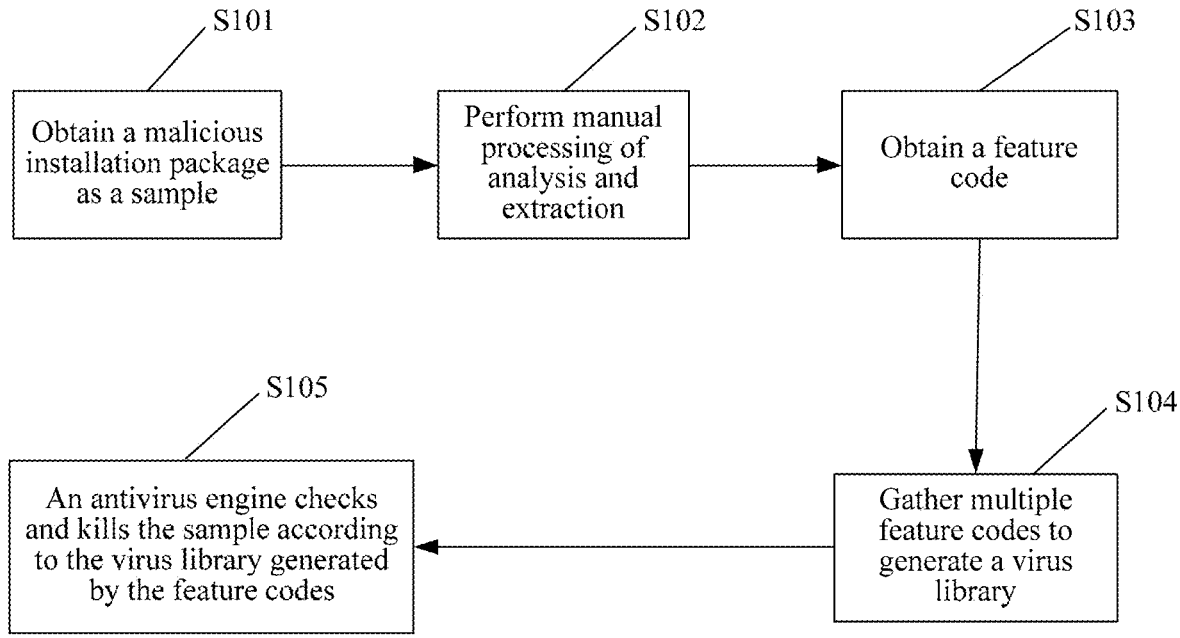
FIG. 1 is a schematic flowchart of an implementation of checking and killing a virus installation package by using a feature code technology.

Generally, an antivirus engine may be disposed on a terminal to detect whether an installation package received by the terminal carries a virus, and the antivirus engine mainly checks and kills a malicious installation package by using a feature code technology. As shown in FIG. 1, the process mainly includes: Step S101. Obtain a malicious installation package as a sample; step S102. Perform manual processing of analysis and extraction, that is, an analyst analyzes the sample according to experience, and extracts code regarded with a problem by the analyst from the sample; step S103. Obtain a feature code, that is, the analyst inputs the extracted code regarded with a problem to the antivirus engine as the feature code; step S104. Gather multiple feature codes to generate a virus library, that is, gather the multiple extracted feature codes to form the virus library; and step S105. The antivirus engine checks and kills the sample according to the virus library generated by the feature codes, that is, determines, after obtaining the virus library, whether a to-be-detected installation package received by the terminal includes the feature codes in the virus library, and if the to-be-detected installation package includes the feature code, determines that the to-be-detected installation package is a malicious installation package, and displays prompt information indicating that the to-be-detected installation package is a malicious installation package on the terminal, to prompt a user to pay attention, and ensure information security and property security of the user.

To resolve the problem existing in the background, the embodiments of the present disclosure provide a method for obtaining a virus library. The method is applied to a computing device, and functions implemented by the method may be implemented by invoking program code by using a processor in the computing device. Certainly, the program code may be stored in a non-transitory computer readable storage medium. As can be seen, the computing device at least includes a processor and a storage medium. The computing device may be any computing device with an information processing capability, for example, a server or a server cluster.

Figure 2:
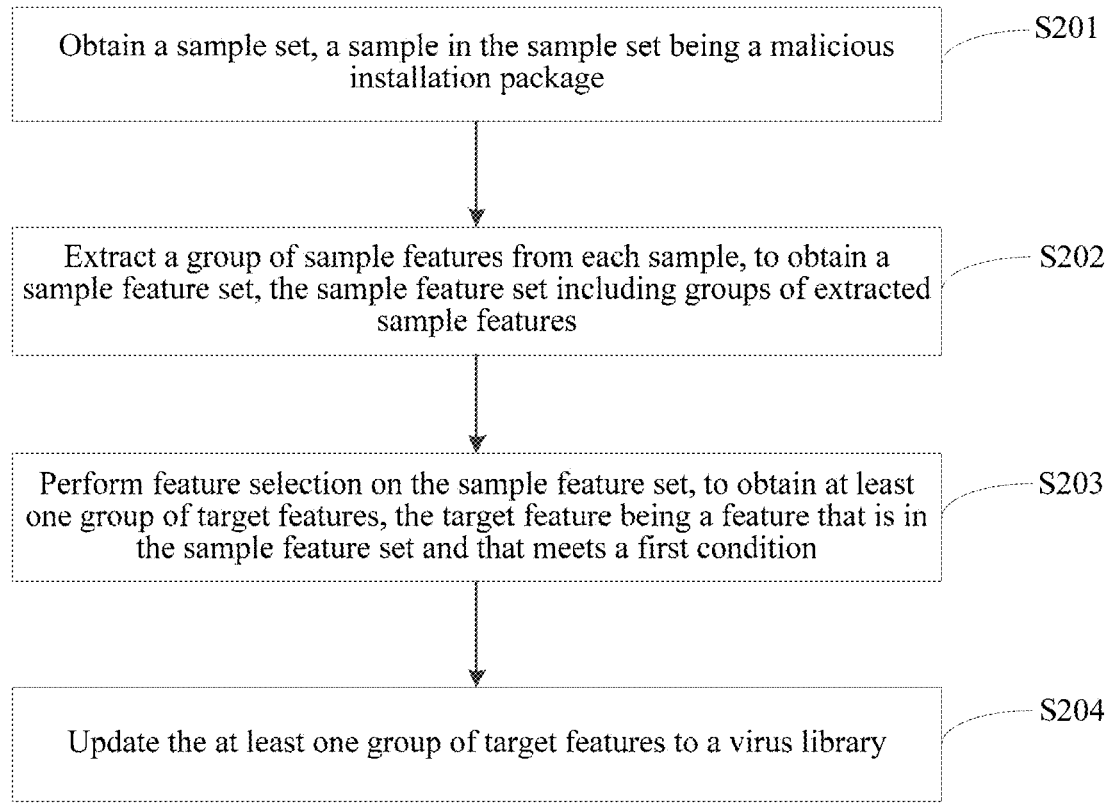
FIG. 2 is a schematic flowchart of an implementation of a method for obtaining a virus library according to an embodiment of the present disclosure.

FIG. 2 is a schematic flowchart of an implementation of a method for obtaining a virus library according to an embodiment of the present disclosure. As shown in FIG. 2, the method for obtaining a virus library includes:

Step S201. Obtain a sample set, each sample in the sample set being a malicious installation package.

The quantity of samples in the sample set, namely, malicious installation packages is huge. The sample may be manually selected, that is, when a user finds that an installation package in a terminal is a malicious installation package, the terminal is triggered to report to the computing device, and the computing device obtains the malicious installation package from the terminal, and places the malicious installation package to the sample set as a sample. Certainly, the sample may also be automatically extracted by using a program. For example, some classification algorithms may be used to automatically extract malicious installation packages from the huge quantity of installation packages. The computing device may continuously obtain samples.

Step S202. Extract a group of sample features from each sample, to obtain a sample feature set, the sample feature set including groups of extracted sample features.

The computing device may continuously extract a group of sample features from each sample, each sample corresponds to a group of sample features, and each group of sample features includes features as many as possible, so that features at multiple dimensions may be used to identify the malicious installation packages, to ensure the accuracy of feature extraction. Meanwhile, when feature selection is performed subsequently, there may be many features for selection, to avoid feature omission, and ensure selected target features to be most representative.

Step S203. Perform feature selection on the sample feature set, to obtain at least one group of target features, each target feature being a feature that is in the sample feature set and that meets a first preset condition.

The sample set is a sample set currently obtained by the computing device, and the first preset condition may be that the impact of the target feature on the groups of sample features in the sample feature set exceeds a preset threshold. For example, the first preset condition may be that the quantity of groups of sample features including the target feature exceeds a preset threshold. Assuming that N groups of sample features on which feature selection is performed, a preset threshold is 50%*N, and if over 50%*N groups of sample features include feature 1, feature 2, and feature 3, feature 1, feature 2, and feature 3 are determined as a group of target features. According to the example, the computing device may select multiple groups of target features from the sample feature set.

Step S204. Update the at least one group of target features to a virus library.

The computing device continuously updates the obtained target features to the virus library, so that the computing device may check and kill an installation package by using the virus library. Certainly, each time the computing device updates the virus library, the computing device sends the virus library to the terminal, and the terminal checks and kills the installation package by using the virus library.

The process for the terminal to check and kill the installation package by using the virus library mainly includes: The terminal obtains a to-be-detected installation package, and extracts a feature of the to-be-detected installation package; then determines whether the feature of the to-be-detected installation package includes any group of target features in the virus library; and determine that the to-be-detected installation package is a malicious installation package when the feature of the to-be-detected installation package includes any group of target features in the virus library.

When the terminal determines that the to-be-detected installation package is a malicious installation package, the terminal may prompt a user that the to-be-detected installation package is a malicious installation package by using a form such as texts, pictures, or voice; and prompt the user to not use the installation package, thereby ensuring information security and property security of the user.

In this embodiment of the present disclosure, the computing device automatically extracts various features of the malicious installation package as sample features, and automatically selects, from the extracted sample features, a target feature that meets a first condition, to generate a virus library by using the automatically selected target feature. The entire process is automatically completed by the computing device, and feature extraction and feature selection on a huge quantity of malicious installation packages can be completed every day, to obtain a large quantity of target features. Compared with manual analysis in the existing technology, less time is cost, the efficiency is high, there is no manual intervention problem in the entire process, and the computing device can automatically select a target feature that meets a first condition. If the antivirus engine detects the installation package by using the selected target feature, researchers of the malicious installation packages cannot bypass detection by simply adjusting code in the installation package. In addition, the target features in the virus library in this embodiment are continuously updated. Even though someone develops a new malicious installation package, by manes of feature extraction and feature selection on the new malicious installation package, a target feature that hits the new malicious installation package can be obtained, so that it is always difficult for the malicious installation package to bypass detection.

Based on the foregoing embodiments, an embodiment of the present disclosure provides a method for obtaining a virus library for an Android Package (APK). The method is applied to a system including multiple servers, and functions implemented by the method may be implemented by means of interactions between the servers in the system. A function implemented by each server may be implemented by a processor by invoking program code. Certainly, the program code may be stored in a storage medium of the server. As can be seen, the server at least includes a processor, a storage medium, and an external communication interface.

Figure 3:
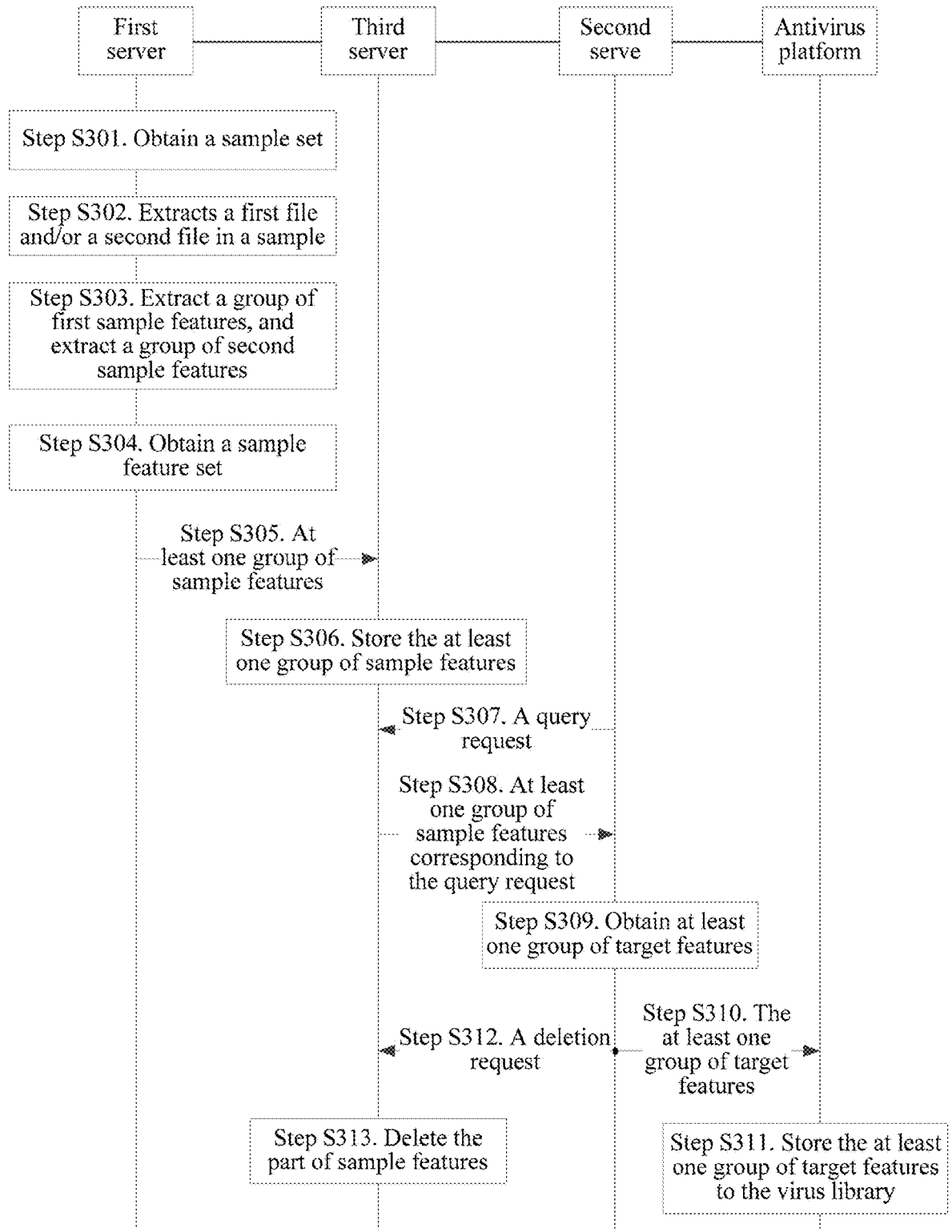
FIG. 3 is a schematic flowchart of an implementation of another method for obtaining a virus library according to an embodiment of the present disclosure.

FIG. 3 is a schematic flowchart of an implementation of another method for obtaining a virus library according to an embodiment of the present disclosure. As shown in FIG. 3, the method for obtaining a virus library includes:

Step S301. A first server obtains a sample set.

A sample in the sample set is a malicious APK.

Step S302. The first server extracts a first file and/or a second file in a sample.

The first file is a main program file of the sample, and the second file is a global configuration file of the sample. When the sample is a malicious APK, the first file is a main program file of the APK, namely, a classes.dex file, and the second file is a global configuration file of the APK, namely, an Androidmanifest.xml file.

The classes.dex file in the APK is generated by a compiler by compiling a main program, and the classes.dex file is an executable file on an Android platform. The Androidmanifest.xml file determines an operation starting manner of the classes.dex file, namely, the main program file. Each APK definitely includes a classes.dex file and an Androidmanifest.xml file.

In another embodiment of the present disclosure, the first server may also only extract a second file of the sample. In another embodiment of the present disclosure, the first server may also extract a first file and a second file of the sample.

Step S303. The first server extracts a group of first sample features from the first file, and extracts a group of second sample features from the second file.

The first server may extract, from the first file, at least one piece of data added by the compiler when compiling the main program, as a group of first sample features. When the compiler compiles the first file generated by the main program, namely, the classes.dex file, the generated first file not only includes data compiled by the main program, but also includes data added by the compiler, such as data indicating the size of the file, signature data, and check data. The first server may extract the data added by the compiler as a group of first sample features. A feature in a group of first sample features is data added by a compiler. A first file in a sample correspondingly extracts a group of first sample features.

The first server may extract at least one first character string in the second file. The first server calculates a cyclic redundancy check (CRC) code of each first character string. The group of second sample features is at least one CRC code. The first character string may be some specific character strings such as a label character string, and an attribute character string in the Androidmanifest.xml file. Each first character string may calculate a CRC code, and CRC codes corresponding to the first character strings form a group of second sample features. A second file in a sample correspondingly extracts a group of second sample features.

For a sample, in an embodiment of the present disclosure, the first server only extracts a first file of the sample, and a group of sample features extracted from a sample by the first server is a group of first sample features. In another embodiment of the present disclosure, the first server only extracts a second file of the sample, and a group of sample features extracted from a sample by the first server is a group of second sample features. In another embodiment of the present disclosure, the first server extracts a first file and a second file of the sample, and a group of sample features extracted from a sample by the first server is a group of first sample features and a group of second sample features.

Step S304. The first server obtains a sample feature set after extracting a group of sample features from each sample.

The first server performs step S302 and step S303, and extracts a group of sample features from each sample, to obtain a sample feature set, the sample feature set including groups of extracted sample features.

Step S305. The first server sends at least one group of sample features to a third server.

The first server may continuously input at least one group of sample features in the sample feature set to the third server.

Step S306. The third server receives and stores the at least one group of sample features.

The third server is an ES (Elastic Search) server. The ES server is a search server based on Lucene, provides a full-text search engine with a distributed multi-user capability, can store a huge quantity of data, and can achieve real-time search, stability, reliability, and speediness.

Step S307. The second server sends a query request to the third server.

The second server needs to query the third server to obtain a sample feature for learning. The second server actively sends a query request to the third server. The query request is used to request the third server to return at least one group of sample features that are not sent to the second server.

Step S308. The third server obtains, after receiving the query request, at least one group of sample features corresponding to the query request, and sends the corresponding at least one group of sample features to the second server.

The third server is an ES server, and therefore may rapidly perform a query to obtain the at least one group of sample features corresponding to the query request and send the at least one group of sample features to the second server.

Step S309. The second server performs feature selection on the groups of received sample features after receiving the at least one group of sample features, to obtain at least one group of target features.

The second server mainly facilitates a data mining machine learning algorithm, and performs automatic clustering learning on extracted sample features, to select at least one group of target features. The data mining machine learning algorithm may be a classification and regression tree (CART) algorithm; and certainly may also be a C4.5 algorithm, an ID3 algorithm, or the like.

In this embodiment of the present disclosure, storage and query performance of the third server is used, so that the second server obtains, by using the third server, a sample feature extracted by the first server. In another embodiment of the present disclosure, the second server may also directly obtain, from the first server, a sample feature used for learning.

In an embodiment of the present disclosure, the group of sample features includes a group of first sample features or a group of second sample features, and the performing feature selection on the sample feature set, to obtain at least one group of target features includes: sending, by the first server, at least one group of sample features in the sample feature set to the second server; updating, by the second server, after receiving the at least one group of sample features, a node in a decision tree and an attribute value corresponding to the node according to the received at least one group of sample features, the node in the decision tree being used to represent a feature in a sample feature; stopping, by the second server, when a first update parameter of the decision tree updated by the second server meets a second condition, updating the decision tree, to obtain a final decision tree; and determining, by the second server, at least one group of target features according to the final decision tree.

Each time the second server obtains the sample feature, the second server updates the node in the decision tree and the attribute value corresponding to the node according to the obtained sample feature. The node in the decision tree is used to represent a feature in the at least one group of sample features. Assuming that the current decision tree is a decision tree formed after N groups of sample sets are learned, if a group of features represented by all nodes in a path from this node to a decision node corresponding to this node exist in M groups of sample sets, the attribute value corresponding to this node is M/N.

The first update parameter may be the number of updates for the second server to update the decision tree or may be an update time. That the first update parameter being an update time is used as an example. The second condition may be that the update time exceeds a time threshold, that is, a period of time from a time at which the second server generates the decision tree for the first time to a time at which the second server currently updates the decision tree exceeds the time threshold, and the second server stops updating the decision tree, to obtain a final decision tree. The second server determines at least one group of target features according to the final decision tree. The target feature is a feature that is in the sample feature set and that meets a first condition. The first condition may be that M/N exceeds a preset threshold. The feature that meets the first preset condition is a group of features represented by all nodes in a path from a node whose M/N exceeds the preset threshold to a decision node corresponding to the node. The group of features is a group of target features. In this way, the second server may determine at least one group of target features according to the decision tree.

The time threshold may be 12 hours, that is, the second server automatically outputs at least one group of target features at a cycle of every 12 hours. The CART algorithm may construct a binary decision tree, and a longer operation indicates a larger decision tree, a longer computing time, and lower performance. Therefore, in combination with the characteristic of the CART algorithm, namely, in the situation in which a longer time indicates lower efficiency and performance, it obtains through testing that 12 hours is a relatively reasonable time, so that the performance of the algorithm can be fully exerted, and less time is wasted.

In another embodiment of the present disclosure, the group of sample features includes a group of first sample features and a group of second sample features, and the performing feature selection on the sample feature set, to obtain at least one group of target features includes: sending, by the first server, at least one group of sample features in the sample feature set to the second server; updating, by the second server, after receiving the at least one group of sample features, a first node in a first decision tree and an attribute value corresponding to the first node according to a first sample feature in the at least one group of sample features, and updating a second node in a second decision tree and an attribute value corresponding to the second node according to a second sample feature in the at least one group of sample features, the first node in the first decision tree being used to represent a feature in the group of first sample features, and the second node in the second decision tree being used to represent a feature in the group of second sample features; stopping, by the second server, when a second update parameter of the first decision tree and/or the second decision tree updated by the second server meets a third preset condition, updating the first decision tree, to obtain a final first decision tree, and stopping updating the second decision tree, to obtain a final second decision tree; and determining, by the second server, at least one group of first features according to the final first decision tree, and determining at least one group of second features according to the final second decision tree, the group of first features being a group of target features, and the group of second features being a group of target features.

The second server performs feature clustering learning on the first sample feature and the second sample feature separately. For the process, reference may be made to the description in the foregoing one embodiment. The first update parameter may be the number of updates or an update time for the second server to update the first decision tree, or may be the number of updates or an update time for the second server to update the second decision tree, or may be the number of common updates or a common update time for the second server to update the first decision tree and the second decision tree.

Step S310. The second server sends the at least one group of target features to an antivirus platform.

After the second server determines at least one group of target features, the second server sends the at least one group of target features to the antivirus platform.

Step S311. The antivirus platform receives the at least one group of target features, and stores the at least one group of target features to the virus library.

The antivirus platform may be a terminal, and a virus library is disposed in the terminal. After receiving the at least one group of target features, the terminal stores the at least one group of target features to the virus library, so that after obtaining a to-be-detected installation package, the terminal extracts a feature of the to-be-detected installation package. The antivirus platform determines whether the feature of the to-be-detected installation package includes any group of target features in the virus library; and determines that the to-be-detected installation package is a malicious installation package when the feature of the to-be-detected installation package includes any group of target features in the virus library.

The antivirus platform may also be an antivirus server. A virus library is disposed in the antivirus server, and after receiving the at least one group of target features, the antivirus server stores the at least one group of target features to the virus library, so that the terminal extracts a feature of the to-be-detected installation package after obtaining the to-be-detected installation package; and then sends the feature of the to-be-detected installation package to the antivirus server. The antivirus server determines whether the feature of the to-be-detected installation package includes any group of target features in the virus library; determines that the to-be-detected installation package is a malicious installation package when the feature of the to-be-detected installation package includes any group of target features in the virus library; and then sends a detection result to the terminal.

When the terminal determines that the to-be-detected installation package is a malicious installation package, the terminal may prompt a user that the to-be-detected installation package is a malicious installation package by using a form such as texts, pictures, or voice; and prompt the user to not use the installation package, thereby ensuring information security and property security of the user.

Step S312. The second server sends a deletion request to the third server.

After determining the at least one group of target features, the second server deletes the previous decision tree, and may perform step S307 to step S310, to perform a new round of obtaining a sample feature and generating and updating a decision tree. Meanwhile, the second server sends a deletion request to the third server, the deletion request being used to request the third server to delete a part of sample features stored in the third server, and each of the part of sample features at least including a group of target features. That is, clustering learning has been performed on the part of sample features, and the target feature may hit the part of sample features.

Step S313. The third server deletes the part of sample features after receiving the deletion request.

The ES server deletes a sample feature that may be hit by the target feature. This embodiment of the present disclosure is applicable to selection of a huge quantity of sample features. The quantity of the sample features in the ES server is very large and usually is millions, and the first server continuously inputs sample features, so that the sample features in the ES server increase continuously. If there is no update and deletion process, the efficiency of the third server may be reduced. Meanwhile, each time the second server performs iterative learning, it is very possible that the second server repeatedly learns the same sample feature.

In this embodiment of the present disclosure, various features of the malicious installation package are automatically extracted as sample features, and a target feature that meets a first condition is automatically selected from the extracted sample features, to generate a virus library by using the automatically selected target feature. The entire process is automatically completed by a computing device, and feature extraction and feature selection on a huge quantity of malicious installation packages can be completed every day, to obtain a large quantity of target features. Compared with manual analysis in the existing technology, less time is cost, the efficiency is high, there is no manual intervention problem in the entire process, and a target feature that meets a first condition can be automatically selected. If the antivirus platform detects the installation package by using the selected target feature, researchers of the malicious installation packages cannot bypass detection by simply adjusting code in the installation package. In addition, the target features in the virus library in this embodiment are continuously updated. Even though someone develops a new malicious installation package, by manes of feature extraction and feature selection on the new malicious installation package, a target feature that hits the new malicious installation package can be obtained, so that it is always difficult for the malicious installation package to bypass detection. In addition, in the method of this embodiment, by using the foregoing system architecture, a huge quantity of data can be processed, and the use of the ES server also improves the efficiency and reliability of the entire method.

Figure 4:
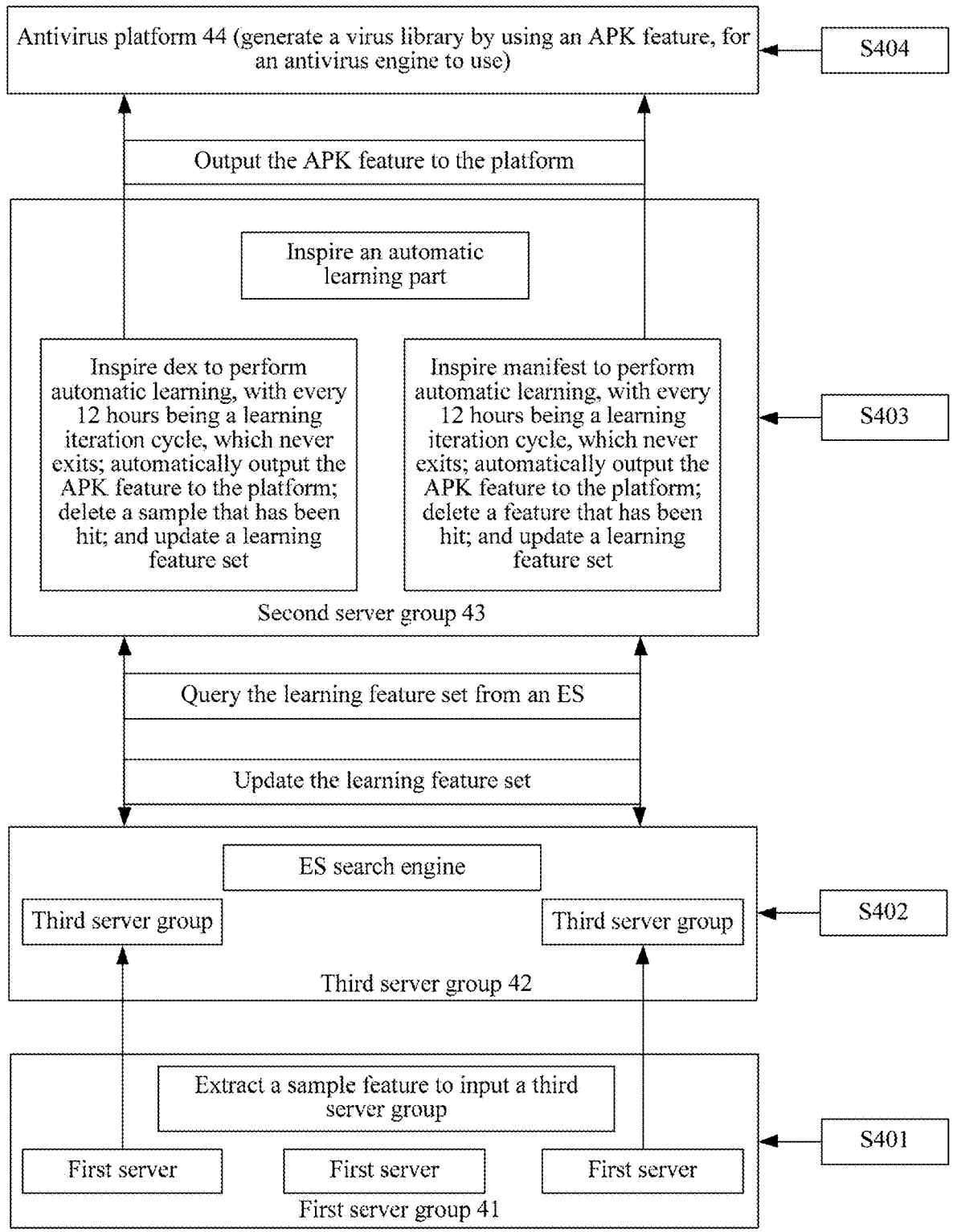
FIG. 4 is a schematic flowchart of an implementation of still another method for obtaining a virus library according to an embodiment of the present disclosure.

Based on the foregoing embodiments, an embodiment of the present disclosure provides a method for obtaining a virus library for an APK. The method is applied to the system shown in FIG. 4. The system includes a first server group 41, a third server group 42, a second server 43, and an antivirus platform 44. The method for obtaining a virus library includes:

Step S401. The first server group 41 is responsible for extracting sample features from a huge quantity of samples, and inputting the extracted sample features to the third server group 42.

A first server in the first server group 41 may extract the sample features by referring to the description of the foregoing step S301 to step S305.

Step S402. The third server group 42 continuously obtains sample features to form a learning feature set, and the second server 43 queries the learning feature set from the third server group 42 to obtain a sample feature used for learning.

The third server is an ES server, and an ES search engine is disposed in the ES server. For a query process, reference may be made to the description of the foregoing step S306 to S308.

Step S403. The second server 43 inspires automatic learning.

The second server 43 inspires dex, namely, the first file to perform automatic learning, with every 12 hours being a learning iteration cycle, which never exits; automatically outputs an APK feature, namely, at least one group of target features to the antivirus platform, to inform the third server group 42 to delete a sample feature that has been hit; and updates a learning feature set in the third server group 42. Meanwhile, the second server 43 inspires manifest, namely, the second file to perform automatic learning, with every 12 hours being a learning iteration cycle, which never exits; automatically outputs an APK feature, namely, at least one group of target features to the antivirus platform, to inform the third server group 42 to delete a sample feature that has been hit; and updates a learning feature set in the third server group 42.

For the foregoing process, reference may be made to the description of the foregoing step S309 to S310 and step S312 to S313.

Step S404. The antivirus platform generates a virus library by using the APK feature, namely, the target feature, for the antivirus platform to use.

For the foregoing process, reference may be made to the description of the foregoing step S311.

The virus library obtained by using the method in this embodiment detects unknown new APK samples, namely, new APK samples generated on the Internet, and malicious samples that have never been collected and analyzed. The total quantity of samples detected every day and the quantity of detected malicious APKs are shown in Table 1.

TABLE 1

| Time | Total quantity of samples | Quantity of detected malicious APKs |
|---|---|---|
| 20160505 | 153700 | 26355 |
| 20160504 | 123371 | 17449 |
| 20160503 | 156072 | 25167 |
| 20160502 | 126325 | 18759 |
| 20160501 | 93647 | 9043 |
| 20160430 | 114253 | 19378 |
| 20160429 | 93507 | 8459 |
| 20160428 | 72702 | 12300 |

As can be seen from Table 1, the virus library obtained in this embodiment detects unknown new samples, and always keeps over 10% of accuracy for detection on unknown new samples every day. The accuracy is far exceeds the accuracy for detection on unknown new samples by using a feature code technology. The detection rate is high, and the false alarm rate is low.

In the method of this embodiment, by using the foregoing system architecture, a huge quantity of data can be processed, and the use of the ES server also improves the efficiency and reliability of the entire method.

Based on the foregoing embodiments, an embodiment of the present disclosure provides an apparatus for obtaining a virus library. Units included in the apparatus for obtaining a virus library, and modules included in the units may be implemented by a processor in the apparatus, and certainly may also be implemented by using a logical circuit. In a process of this embodiment, the processor may be a central processing unit (CPU), a micro processing unit (MPU), a digital signal processor (DSP), a field programmable gate array (FPGA), or the like.

Figure 5:
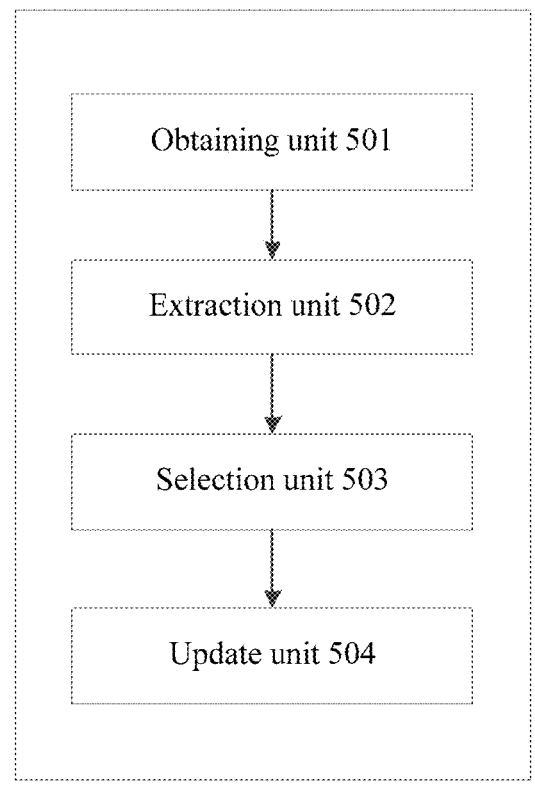
FIG. 5 is a schematic structural diagram of a composition of an apparatus for obtaining a virus library according to an embodiment of the present disclosure.

FIG. 5 is a schematic structural diagram of a composition of an apparatus for obtaining a virus library according to an embodiment of the present disclosure. As shown in FIG. 5, the apparatus includes an obtaining unit 501, an extraction unit 502, a selection unit 503, and an update unit 504.

The obtaining unit 501 is configured to obtain a sample set, each sample in the sample set being a malicious installation package.

The extraction unit 502 is configured to extract a group of sample features from each sample, to obtain a sample feature set, the sample feature set including groups of extracted sample features.

The selection unit 503 is configured to perform feature selection on the sample feature set, to obtain at least one group of target features, each target feature being a feature that is in the sample feature set and that meets a first preset condition.

The update unit 504 is configured to update the at least one group of target features to a virus library.

In another embodiment of the present disclosure, the extraction unit 502 is configured to extract a first file and/or a second file in a sample, extract a group of first sample features from the first file, and extract a group of second sample features from the second file, the first file being a main program file of the sample, the second file being a global configuration file of the sample, and the group of sample features including a group of first sample features and/or a group of second sample features.

In another embodiment of the present disclosure, the first file is a main program file generated by a compiler by compiling a main program. The extraction unit 502 is configured to extract, from the first file, at least one piece of data added by the compiler when compiling the main program, as a group of first sample features.

In another embodiment of the present disclosure, the extraction unit 502 is configured to extract at least one first character string in the second file; and calculate a CRC code of each first character string. The group of second sample features is at least one CRC code.

In another embodiment of the present disclosure, the group of sample features includes a group of first sample features or a group of second sample features, and the selection unit 503 is configured to receive at least one group of sample features in the sample feature set that are sent by the extraction unit; update a node in a decision tree and an attribute value corresponding to the node according to the received at least one group of sample features, the node in the decision tree being used to represent a feature in the at least one group of sample features; stop, when a first update parameter of the updated decision tree meets a second condition, updating the decision tree, to obtain a final decision tree; and determine at least one group of target features according to the final decision tree.

In another embodiment of the present disclosure, the group of sample features includes a group of first sample features and a group of second sample features, and the selection unit 503 is configured to receive at least one group of sample features in the sample feature set that are sent by the extraction unit 502; update a first node in a first decision tree and an attribute value corresponding to the first node according to a first sample feature in the at least one group of sample features, and update a second node in a second decision tree and an attribute value corresponding to the second node according to a second sample feature in the at least one group of sample features, the first node in the first decision tree being used to represent a feature in the group of first sample features, and the second node in the second decision tree being used to represent a feature in the group of second sample features; stop, when a second update parameter of the updated first decision tree and/or second decision tree meets a third preset condition, updating the first decision tree, to obtain a final first decision tree, and stop updating the second decision tree, to obtain a final second decision tree; and determine a group of first features according to the final first decision tree, and determine a group of second features according to the final second decision tree, the group of first features being a group of target features, and the group of second features being a group of target features.

In another embodiment of the present disclosure, the apparatus further includes a storage unit, where the storage unit is configured to obtain and store at least one group of sample features from the extraction unit; the selection unit 503 is configured to send a query request to the storage unit, the query request being used to request the third server to return at least one group of sample features that are not sent to the second server; and the storage unit is configured to obtain, after receiving the query request, a sample feature corresponding to the query request, and send the corresponding sample feature to the selection unit.

In another embodiment of the present disclosure, the selection unit 503 is configured to send a deletion request to the storage unit, the deletion request being used to request the storage unit to delete a part of sample features stored in the storage unit, and each of the part of sample features at least including a group of target features; and the storage unit is configured to delete the part of sample features after receiving the deletion request.

In another embodiment of the present disclosure, the update unit 504 is configured to store the at least one group of target features to a virus library; obtain a to-be-detected installation package, and extract a feature of the to-be-detected installation package; determine whether the feature of the to-be-detected installation package includes any group of target features in the virus library; and determine that the to-be-detected installation package is a malicious installation package when the feature of the to-be-detected installation package includes any group of target features in the virus library.

Herein, it should be noted that, the description of the foregoing apparatus embodiment is similar to the description of the foregoing method embodiment. The apparatus embodiment has a beneficial effect similar to the method embodiment, and therefore is not described again. For the technical details not disclosed in the apparatus embodiment of the present disclosure, refer to the description of the method embodiment of the present disclosure for understanding. To reduce space, no description is provided again.

Figure 6:
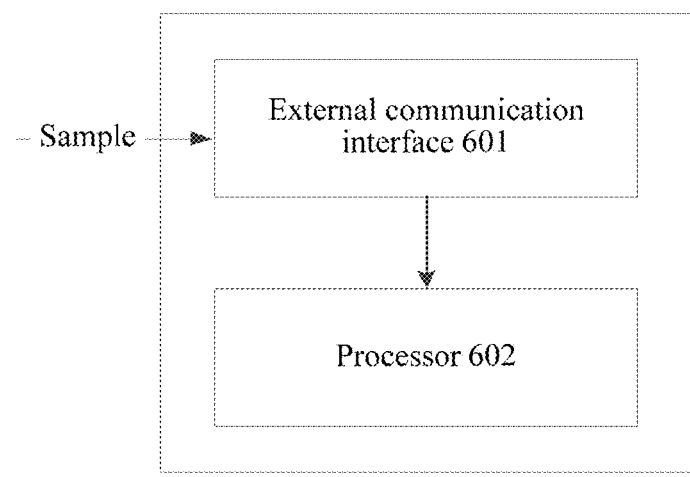
FIG. 6 is a schematic structural diagram of a hardware composition of a device for obtaining a virus library according to an embodiment of the present disclosure.

Based on the foregoing embodiments, an embodiment of the present disclosure provides a device for obtaining a virus library. FIG. 6 is a schematic structural diagram of a composition of the device according to an embodiment of the present disclosure. As shown in FIG. 6, the device includes an external communication interface 601 and a processor 602.

The external communication interface 601 is configured to obtain a sample set, each sample in the sample set being a malicious installation package.

The processor 602 is configured to extract a group of sample features from each sample, to obtain a sample feature set, the sample feature set including groups of extracted sample features; perform feature selection on the sample feature set, to obtain at least one group of target features, each target feature being a feature that is in the sample feature set and that meets a first preset condition; and update the at least one group of target features to a virus library.

Herein, it should be noted that, the description of the foregoing device embodiment is similar to the description of the foregoing method embodiment. The apparatus embodiment has a beneficial effect same as the method embodiment, and therefore is not described again. For the technical details not disclosed in the device embodiment of the present disclosure, refer to the description of the method embodiment of the present disclosure by a person skilled in the art for understanding. To reduce space, no description is provided again.

Figure 7:
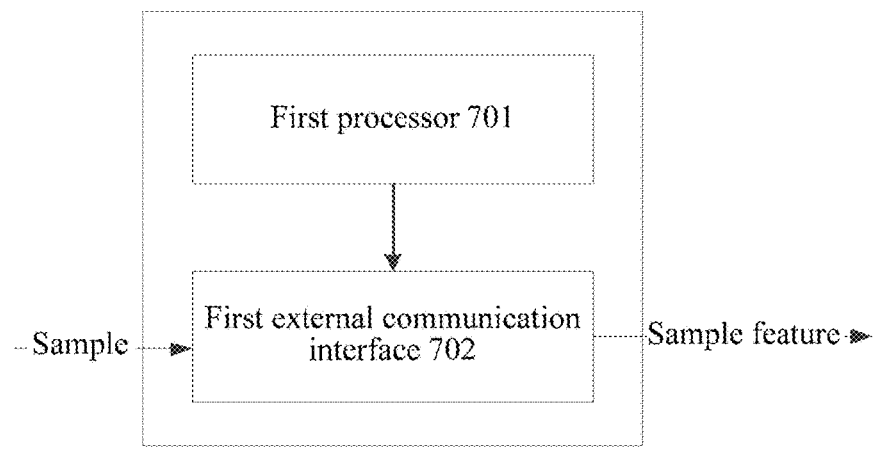
FIG. 7 is a schematic structural diagram of a hardware composition of a first server according to an embodiment of the present disclosure.

Based on the foregoing embodiments, an embodiment of the present disclosure provides a first server. FIG. 7 is a schematic structural diagram of a composition of the first server according to an embodiment of the present disclosure. As shown in FIG. 7, the first server includes a first processor 701 and a first external communication interface 702.

The external communication interface 702 is configured to obtain a sample set, each sample in the sample set being a malicious installation package.

The first processor 701 is configured to extract a group of sample features from each sample, to obtain a sample feature set, the sample feature set including groups of extracted sample features.

The first external communication interface 702 is configured to send at least one group of sample features in the sample feature set.

In another embodiment of the present disclosure, the first processor 701 is configured to extract a first file and/or a second file in a sample, the first file being a main program file of the sample, and the second file being a global configuration file of the sample; extract a group of first sample features from the first file, and extract a group of second sample features from the second file, the group of sample features including a group of first sample features and/or a group of second sample features.

In another embodiment of the present disclosure, the first file is a main program file generated by a compiler by compiling a main program. The first processor 701 is configured to extract, from the first file, at least one piece of data added by the compiler when compiling the main program, as a group of first sample features.

In another embodiment of the present disclosure, the first processor 701 is configured to extract at least one first character string in the second file; and calculate a CRC code of each first character string. The group of second sample features is at least one CRC code.

Figure 8:
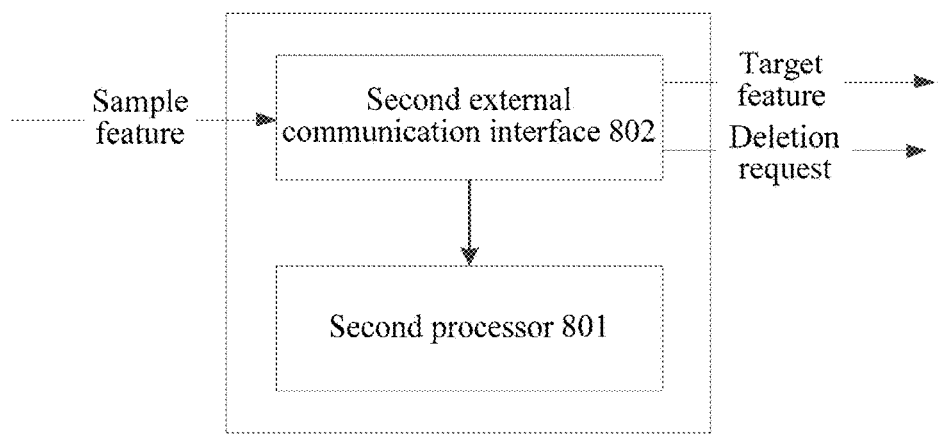
FIG. 8 is a schematic structural diagram of a hardware composition of a second server according to an embodiment of the present disclosure.

An embodiment of the present disclosure further provides a second server. FIG. 8 is a schematic structural diagram of a composition of the second server according to an embodiment of the present disclosure. As shown in FIG. 8, the second server includes a second processor 801 and a second external communication interface 802.

The second external communication interface 802 is configured to receive at least one group of sample features.

The second processor 801 is configured to obtain at least one group of target features according to received sample features, the target feature being a feature that is in the received sample features and that meets a first condition.

The second external communication interface 802 is configured to send the at least one group of target features.

In another embodiment of the present disclosure, when the group of sample features includes a group of first sample features or a group of second sample features, the second processor 801 is configured to update a node in a decision tree and an attribute value corresponding to the node according to the received at least one group of sample features, the node in the decision tree being used to represent a feature in the at least one group of sample features; stop, when a first update parameter of the updated decision tree meets a second condition, updating the decision tree, to obtain a final decision tree; and determine at least one group of target features according to the final decision tree.

In another embodiment of the present disclosure, when the group of sample features includes a group of first sample features or a group of second sample features, the second processor 801 is configured to: update a first node in a first decision tree and an attribute value corresponding to the first node according to a first sample feature in the at least one group of sample features, and update a second node in a second decision tree and an attribute value corresponding to the second node according to a second sample feature in the at least one group of sample features, the first node in the first decision tree being used to represent a feature in the group of first sample features, and the second node in the second decision tree being used to represent a feature in the group of second sample features; stop, when a second update parameter of the updated first decision tree and/or second decision tree meets a third preset condition, updating the first decision tree, to obtain a final first decision tree, and stop updating the second decision tree, to obtain a final second decision tree; determine a group of first features according to the final first decision tree, and determine a group of second features according to the final second decision tree, the group of first features being a group of target features, and the group of second features being a group of target features.

In another embodiment of the present disclosure, the second external communication interface 802 is configured to send a query request to the third server, the query request being used to request the third server to return at least one group of sample features that are not sent to the second server; and is further configured to obtain a sample feature corresponding to the query request returned by the third server.

In another embodiment of the present disclosure, the second external communication interface 802 is configured to send a deletion request to the third server, the deletion request being used to request the third server to delete a part of sample features stored in the third server, and each of the part of sample features at least including a group of target features.

Figure 9:
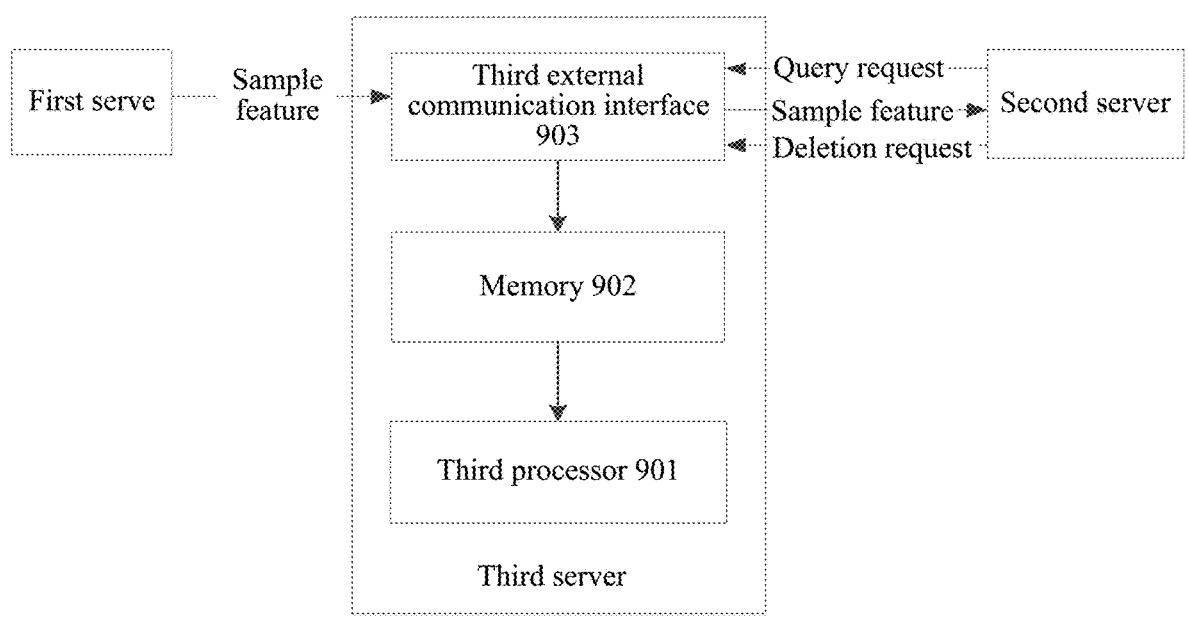
FIG. 9 is a schematic structural diagram of a hardware composition of a third server according to an embodiment of the present disclosure.

An embodiment of the present disclosure further provides a third server. FIG. 9 is a schematic structural diagram of a composition of a third server according to an embodiment of the present disclosure. As shown in FIG. 9, the third server includes a third processor 901, a memory 902, and a third external communication interface 903.

The third external communication interface 903 is configured to receive at least one group of sample features sent by the first server.

The memory 902 is configured to store the at least one group of sample features.

The third external communication interface 903 is configured to receive a query request sent by the second server, the query request being used to request the third server to return at least one group of sample features that are not sent to the second server.

The third processor 901 is configured to obtain a sample feature corresponding to the query request.

The third external communication interface 903 is configured to send the corresponding sample feature to the second server.

In another embodiment of the present disclosure, the third external communication interface 903 is configured to receive a deletion request sent by the second server, the deletion request being used to request the third server to delete a part of sample features stored in the third server, and each of the part of sample features at least includes a group of target features; and the third processor 901 is configured to delete the part of sample feature.

Herein, it should be noted that, the description of the foregoing device embodiment is similar to the description of the foregoing method embodiment. The apparatus embodiment has a beneficial effect same as the method embodiment, and therefore is not described again. For the technical details not disclosed in the device embodiment of the present disclosure, refer to the description of the method embodiment of the present disclosure by a person skilled in the art for understanding. To reduce space, no description is provided again.

Figure 10:
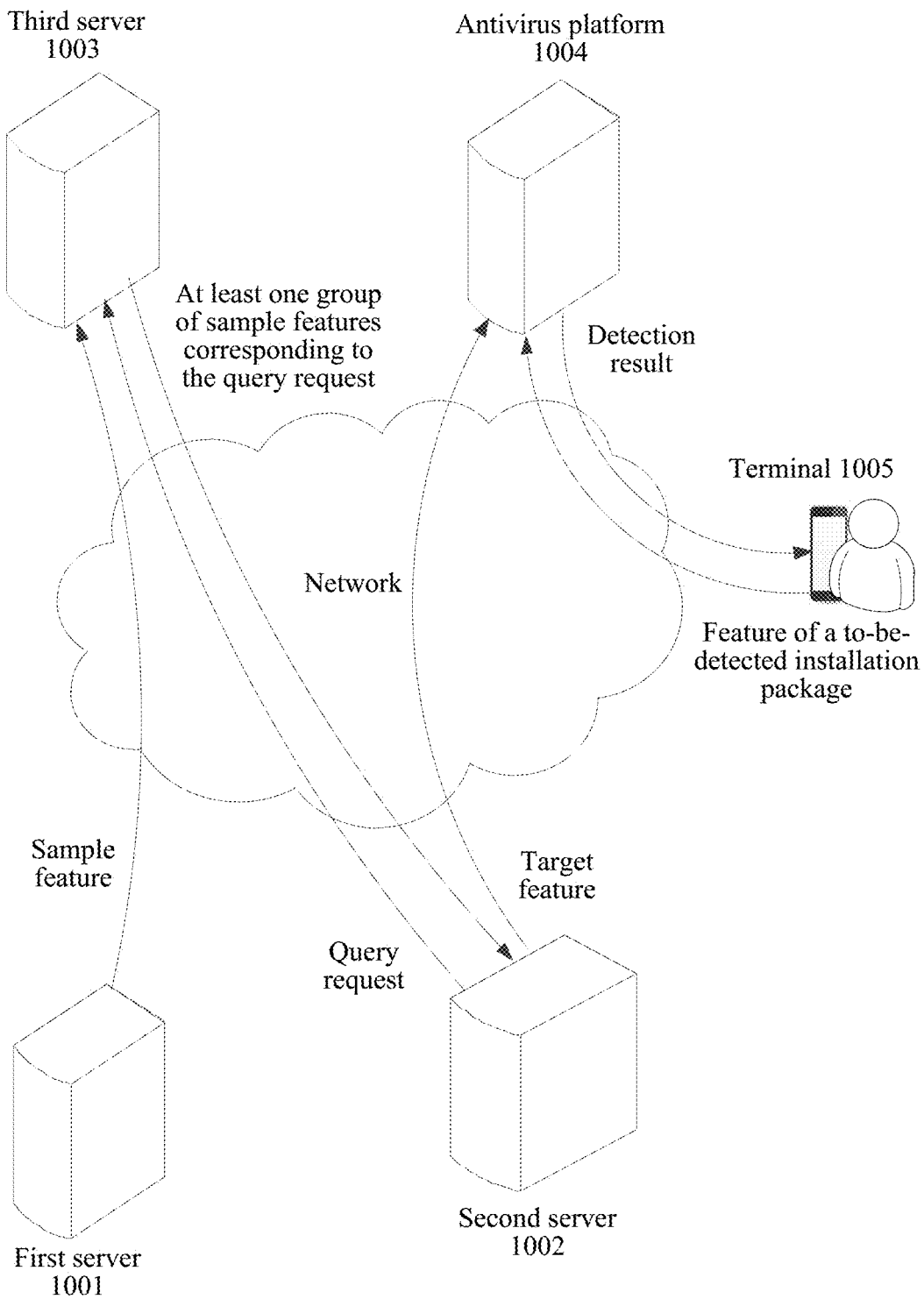
FIG. 10 is a schematic structural diagram of a composition of a system according to an embodiment of the present disclosure.

Based on the foregoing embodiments, an embodiment of the present disclosure provides a system. FIG. 10 is a schematic structural diagram of a composition of the system according to an embodiment of the present disclosure. As shown in FIG. 10, the system includes a first server 1001, a second server 1002, a third server 1003, and an antivirus platform 1004.

The first server 1001 is configured to obtain a sample set, each sample in the sample set being a malicious installation package; extract a group of sample features from each sample, to obtain a sample feature set, the sample feature set including groups of extracted sample features; and send at least one group of sample features in the sample feature set to the third server 1003.

The third server 1003 is configured to receive and store at least one group of sample features sent by the first server; receive a query request sent by the second server, the query request being used to request the third server to return at least one group of sample features that are not sent to the second server; obtain a sample feature corresponding to the query request; and send the corresponding sample feature to the second server 1002.

The second server 1002 is configured to receive at least one group of sample features; obtain at least one group of target features according to received sample features, the target feature being a feature that is in the received sample features and that meets a first condition; and send the at least one group of target features to the antivirus platform 1004.

The antivirus platform 1004 is configured to receive the at least one group of target features, and store the at least one group of target features to a virus library.

A virus library is disposed in the antivirus platform, and after receiving the at least one group of target features, the antivirus platform stores the at least one group of target features to the virus library, so that a terminal 1005 extracts a feature of the to-be-detected installation package after obtaining the to-be-detected installation package; and then sends the feature of the to-be-detected installation package to the antivirus platform. The antivirus platform determines whether the feature of the to-be-detected installation package includes any group of target features in the virus library; determines that the to-be-detected installation package is a malicious installation package when the feature of the to-be-detected installation package includes any group of target features in the virus library; and then sends a detection result to the terminal 1005. When the terminal determines that the to-be-detected installation package is a malicious installation package, the terminal 1005 may prompt a user that the to-be-detected installation package is a malicious installation package by using a form such as texts, pictures, or voice; and prompt the user to not use the installation package, thereby ensuring information security and property security of the user.

Herein, it should be noted that, the description of the foregoing system embodiment is similar to the description of the foregoing method embodiment. The apparatus embodiment has a beneficial effect same as the method embodiment, and therefore is not described again. For the technical details not disclosed in the device embodiment of the present disclosure, a person skilled in the art refers to the description of the method embodiment of the present disclosure for understanding.

It should be noted that, in the embodiments of the present disclosure, when the foregoing method for obtaining a virus library is implemented in a form of a software functional module and sold or used as an independent product, the method may be stored in a computer-readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a server, a network device, or the like) to perform all or some of the methods in the embodiments of the present disclosure. The foregoing storage medium includes: any medium that can store program code, such as a USB flash drive, a removable hard disk, a read-only memory (ROM), a magnetic disk, or an optical disc. In this way, the embodiments of the present disclosure are not limited to any specific combination of hardware and software.

Correspondingly, an embodiment of the present disclosure further provides a non-transitory computer readable storage medium, the non-transitory computer readable storage medium storing computer executable instructions, and the computer executable instructions being used to perform the method for obtaining a virus library in the embodiments of the present disclosure.

It should be understood that, "one embodiment" or "an embodiment" mentioned throughout this specification means that a specific feature, structure, or characteristic related to the embodiments is included in at least one embodiment of the present disclosure. Therefore, "in one embodiment" or "in an embodiment" in the entire specification not necessarily refers to a same embodiment. In addition, the specific feature, structure, or characteristic may be combined in one or more embodiments in any suitable manner. It should be understood that, in various embodiments of the present disclosure, the sequence numbers of the foregoing processes do not mean the execution sequence. The execution sequence of the processes should be determined according to the function and internal logic, and should not constitute any limitation to the implementation processes of the embodiments of the present disclosure. The sequence numbers of the foregoing embodiments of the present disclosure are merely for description purpose but do not indicate the preference of the embodiments.

It should be noted that, the terms "include", "comprise", and any variants thereof herein are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

In the several embodiments provided in the present application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments. In addition, the functional units in the embodiments of the present disclosure may all be integrated into one processing unit, or each of the units may independently serve as one unit, or two or more units may be integrated into one unit. The integrated unit may be implemented in the form of hardware, or may be implemented in the form of a hardware plus software functional unit.

A person of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program code, such as a removable storage device, a read-only memory (RAM), a magnetic disk, and an optical disc. Alternatively, when the integrated units are implemented in a form of a software functional module and sold or used as an independent product, the modules may be stored in a computer-readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a server, a network device, or the like) to perform all or some of the methods in the embodiments of the present disclosure. The storage medium includes various media that may store processing code, such as a removable storage device, a ROM, a magnetic disk, and an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

The entire process of the embodiments of the present disclosure is automatically completed by a computing device, and feature extraction and feature selection on a huge quantity of malicious installation packages can be completed every day, to obtain a large quantity of target features. Compared with manual analysis in the existing technology, less time is cost, the efficiency is high, there is no manual intervention problem in the entire process, and the computing device can automatically select a target feature that meets a first condition. An antivirus platform detects an installation package by using the selected target feature, researchers of the malicious installation packages cannot bypass detection by simply adjusting code in the installation package, and a new malicious installation package can be identified more accurately.

What is claimed is:
1. A method for obtaining a virus library performed at a computing system having one or more processors and memory storing a plurality of programs to be executed by the one or more processors, the method comprising:

obtaining a sample set, wherein each sample in the sample set corresponds to a respective malicious installation package;

extracting a respective group of sample features from each sample in the sample set to obtain a plurality of groups of sample features, further including:
    extracting a respective group of first sample features from a main program file of each sample or a respective group of second sample features from a global configuration file of each sample;

performing feature selection on the plurality of groups of sample features to obtain at least one group of target features, further including:
    in accordance with a determination that a respective sample feature is found in at least a predefined percentage of the plurality of groups of sample features, storing the respective sample feature in the at least one group of target features;

updating the at least one group of target features to a virus library; and updating the plurality of groups of sample features by deleting the at least one group of target features from the plurality of groups of sample features.

2. The method according to claim 1, wherein the extracting a group of sample features from each sample further comprises:
    extracting a first file and/or a second file in a sample, the first file being a main program file of the sample, and the second file being a global configuration file of the sample; and
    extracting a group of first sample features from the first file and a group of second sample features from the second file, the group of sample features comprising the group of first sample features and the group of second sample features.

3. The method according to claim 2, wherein the first file is a main program file generated by a compiler by compiling a main program; and the extracting a group of first sample features from the first file further comprises:
    extracting, from the first file, at least one piece of data added by the compiler when compiling the main program, as the group of first sample features.

4. The method according to claim 2, wherein the extracting a group of second sample features from the second file further comprises:
    extracting at least one first character string in the second file; and
    calculating a cyclic redundancy check (CRC) code of each first character string, the group of second sample features being at least one CRC code.

5. The method according to claim 2, wherein the group of sample features comprises one of the group of first sample features and the group of second sample features, and the performing feature selection on the sample feature set, to obtain at least one group of target features further comprises:
    updating a node in a decision tree and an attribute value corresponding to the node according to the at least one group of sample features, the node in the decision tree being used to represent a feature in the at least one group of sample features;
    when a first update parameter of the decision tree meets a second preset condition, stopping updating the decision tree to obtain a final decision tree; and
    determining at least one group of target features according to the final decision tree.

6. The method according to claim 2, wherein the group of sample features comprises both the group of first sample features and the group of second sample features, and the performing feature selection on the sample feature set, to obtain at least one group of target features further comprises:
    updating a first node in a first decision tree and an attribute value corresponding to the first node according to a first sample feature in the group of sample features, and updating a second node in a second decision tree and an attribute value corresponding to the second node according to a second sample feature in the group of sample features, the first node in the first decision tree being used to represent a feature in the group of first sample features, and the second node in the second decision tree being used to represent a feature in the group of second sample features;
    when a second update parameter of the first decision tree and/or the second decision tree meets a third preset condition, stopping updating the first decision tree, to obtain a final first decision tree, and stopping updating the second decision tree, to obtain a final second decision tree; and
    determining at least one group of first features according to the final first decision tree, and determining at least one group of second features according to the final second decision tree, the group of first features being a group of target features, and the group of second features being a group of target features.

7. The method according to claim 5, wherein the updating the at least one group of target features to a virus library comprises:
    sending the at least one group of target features to an antivirus platform; and
    storing, by the antivirus platform, the at least one group of target features to the virus library.

8. The method according to claim 7, wherein the method further comprises:
    obtaining, by the antivirus platform, a feature of a to-be-detected installation package;
    determining, by the antivirus platform, whether the feature of the to-be-detected installation package comprises any group of target features in the virus library; and
    determining that the to-be-detected installation package is a malicious installation package when the feature of the to-be-detected installation package comprises any group of target features in the virus library.

9. A computing system having one or more processors, memory coupled to the one or more processors, and a plurality of programs stored in the memory that, when executed by the one or more processors, cause the computing system to perform the following operations:
    obtaining a sample set, wherein each sample in the sample set corresponds to a respective malicious installation package;
    extracting a respective group of sample features from each sample in the sample set to obtain a plurality of groups of sample features, further including:
        extracting a respective group of first sample features from a main program file of each sample or a respective group of second sample features from a global configuration file of each sample;
    performing feature selection on the plurality of groups of sample features to obtain at least one group of target features, further including:
        in accordance with a determination that a respective sample feature is found in at least a predefined percentage of the plurality of groups of sample features, storing the respective sample feature in the at least one group of target features;

updating the at least one group of target features to a virus library; and updating the plurality of groups of sample features by deleting the at least one group of target features from the plurality of groups of sample features.

10. The computing system according to claim 9, wherein the extracting a group of sample features from each sample further comprises:

extracting a first file and/or a second file in a sample, the first file being a main program file of the sample, and the second file being a global configuration file of the sample; and extracting a group of first sample features from the first file and a group of second sample features from the second file, the group of sample features comprising the group of first sample features and the group of second sample features.

11. The computing system according to claim 10, wherein the first file is a main program file generated by a compiler by compiling a main program; and the extracting a group of first sample features from the first file further comprises:

extracting, from the first file, at least one piece of data added by the compiler when compiling the main program, as the group of first sample features.

12. The computing system according to claim 10, wherein the extracting a group of second sample features from the second file further comprises:

extracting at least one first character string in the second file; and calculating a cyclic redundancy check (CRC) code of each first character string, the group of second sample features being at least one CRC code.

13. The computing system according to claim 10, wherein the group of sample features comprises one of the group of first sample features and the group of second sample features, and the performing feature selection on the sample feature set, to obtain at least one group of target features further comprises:

updating a node in a decision tree and an attribute value corresponding to the node according to the at least one group of sample features, the node in the decision tree being used to represent a feature in the at least one group of sample features;

when a first update parameter of the decision tree meets a second preset condition, stopping updating the decision tree to obtain a final decision tree; and determining at least one group of target features according to the final decision tree.

14. The computing system according to claim 10, wherein the group of sample features comprises both the group of first sample features and the group of second sample features, and the performing feature selection on the sample feature set, to obtain at least one group of target features further comprises:

updating a first node in a first decision tree and an attribute value corresponding to the first node according to a first sample feature in the group of sample features, and updating a second node in a second decision tree and an attribute value corresponding to the second node according to a second sample feature in the group of sample features, the first node in the first decision tree being used to represent a feature in the group of first sample features, and the second node in the second decision tree being used to represent a feature in the group of second sample features;

when a second update parameter of the first decision tree and/or the second decision tree meets a third preset condition, stopping updating the first decision tree, to obtain a final first decision tree, and stopping updating the second decision tree, to obtain a final second decision tree; and determining at least one group of first features according to the final first decision tree, and determining at least one group of second features according to the final second decision tree, the group of first features being a group of target features, and the group of second features being a group of target features.

15. A non-transitory computer readable storage medium storing a plurality of computer executable instructions that, when executed by one or more processors of a computing system, cause the computing system to perform the following operations:

obtaining a sample set, wherein each sample in the sample set corresponds to a respective malicious installation package;

extracting a respective group of sample features from each sample in the sample set to obtain a plurality of groups of sample features, further including:

extracting a respective group of first sample features from a main program file of each sample or a respective group of second sample features from a global configuration file of each sample;

performing feature selection on the plurality of groups of sample features to obtain at least one group of target features, further including:

in accordance with a determination that a respective sample feature is found in at least a predefined percentage of the plurality of groups of sample features, storing the respective sample feature in the at least one group of target features;

updating the at least one group of target features to a virus library; and updating the plurality of groups of sample features by deleting the at least one group of target features from the plurality of groups of sample features.

16. The non-transitory computer readable storage medium according to claim 15, wherein the extracting a group of sample features from each sample further comprises:

extracting a first file and/or a second file in a sample, the first file being a main program file of the sample, and the second file being a global configuration file of the sample; and extracting a group of first sample features from the first file and a group of second sample features from the second file, the group of sample features comprising the group of first sample features and the group of second sample features.

17. The non-transitory computer readable storage medium according to claim 16, wherein the first file is a main program file generated by a compiler by compiling a main program; and the extracting a group of first sample features from the first file further comprises:

extracting, from the first file, at least one piece of data added by the compiler when compiling the main program, as the group of first sample features.

18. The non-transitory computer readable storage medium according to claim 16, wherein the extracting a group of second sample features from the second file further comprises:

extracting at least one first character string in the second file; and calculating a cyclic redundancy check (CRC) code of each first character string, the group of second sample features being at least one CRC code.

19. The non-transitory computer readable storage medium according to claim 16, wherein the group of sample features comprises one of the group of first sample features and the group of second sample features, and the performing feature selection on the sample feature set, to obtain at least one group of target features further comprises:

updating a node in a decision tree and an attribute value corresponding to the node according to the at least one group of sample features, the node in the decision tree being used to represent a feature in the at least one group of sample features;

when a first update parameter of the decision tree meets a second preset condition, stopping updating the decision tree to obtain a final decision tree; and determining at least one group of target features according to the final decision tree.

20. The non-transitory computer readable storage medium according to claim 16, wherein the group of sample features comprises both the group of first sample features and the group of second sample features, and the performing feature selection on the sample feature set, to obtain at least one group of target features further comprises:

updating a first node in a first decision tree and an attribute value corresponding to the first node according to a first sample feature in the group of sample features, and updating a second node in a second decision tree and an attribute value corresponding to the second node according to a second sample feature in the group of sample features, the first node in the first decision tree being used to represent a feature in the group of first sample features, and the second node in the second decision tree being used to represent a feature in the group of second sample features;

when a second update parameter of the first decision tree and/or the second decision tree meets a third preset condition, stopping updating the first decision tree, to obtain a final first decision tree, and stopping updating the second decision tree, to obtain a final second decision tree; and determining at least one group of first features according to the final first decision tree, and determining at least one group of second features according to the final second decision tree, the group of first features being a group of target features, and the group of second features being a group of target features.

* * * * *